Nov. 17, 1931. C. C. VAN ARSDALE 1,832,823
METHOD OF AND APPARATUS FOR CONVEYING FLEXIBLE MATERIAL
Filed Dec. 5, 1929 3 Sheets-Sheet 1

Inventor
Clarence C. Van Arsdale
Attorney

Nov. 17, 1931.  C. C. VAN ARSDALE  1,832,823
METHOD OF AND APPARATUS FOR CONVEYING FLEXIBLE MATERIAL
Filed Dec. 5, 1929   3 Sheets-Sheet 2

Inventor
Clarence C. VanArsdale

By
Attorney

Patented Nov. 17, 1931

1,832,823

UNITED STATES PATENT OFFICE

CLARENCE C. VAN ARSDALE, OF AKRON, OHIO, ASSIGNOR TO THE GOODYEAR TIRE & RUBBER COMPANY, OF AKRON, OHIO, A CORPORATION OF OHIO

METHOD OF AND APPARATUS FOR CONVEYING FLEXIBLE MATERIAL

Application filed December 5, 1929. Serial No. 411,773.

This invention relates to conveying systems and has particular relation to a method of and means for conveying a continuous strip of plastic rubber compound from a milling machine to a machine for extruding it in the form of a stock material for rubber tires.

One object of the invention is to provide a conveying system which initially conveys a continuous strip of plastic material at one speed and then so manipulates the strip upon a conveyor operating at different speed that the volume of the stock per unit length is changed.

Another object of the invention is to provide a method of conveying plastic rubber from a milling machine roll operating at a given peripheral speed, to a plastic rubber manipulating machine capable only of receiving rubber conducted to it at a linear speed less than that of the peripheral speed of the roll of the milling machine.

Another object of the invention it to provide a method for so manipulating a strip of plastic material conducted at a given linear speed, that a unit volume of the material may be conveyed at a different linear rate of speed by changing the length of such unit volume.

One method of building solid tires includes extruding plastic rubber compound in the form of solid tire stock and then cutting it into suitable lengths for application individually to tire supporting base bands. It has been the practice heretofore to feed plastic rubber manually into the hopper of an extruding machine in the form of rolls which were provided by drawing predetermined lengths of the rubber from a milling machine and simultaneously rolling such lengths into rolls. These rolls varied in size because the workmen could not gauge accurately the quantity of rubber drawn from the milling machine and, as a result, the rate of supplying rubber to the extruding machine varied. These conditions frequently caused air pockets to be formed in the extruded stock.

Moreover, it was impractical to convey rubber from the milling machine to the extruding machine in the form of a continuous strip, because the linear rate of speed at which the rubber could enter the hopper of the extruding machine was much less than the peripheral speed of the rolls of the milling machine.

According to this invention, a pair of conveyors are provided, one of which has a linear speed equal to the peripheral speed of a roll of the milling machine, while the other has a linear speed equal to the linear speed at which the rubber must be supplied to the hopper of the extruding machine. The first conveyor is disposed partially above the second, and as a strip of rubber is conducted from the first conveyor to the second, it is folded upon itself and in such form conveyed by the second conveyor into the hopper of the extruding machine. Hence, rubber is conducted continuously from the milling machine to the extruding machine.

For a better understanding of the invention, reference may now be had to the accompanying drawings, forming a part of this specification, in which:

Figure 4 is a fragmentary, elevational view of that part of the system disposed adjacent the rubber extruding machine;

Figure 5 is a fragmentary view, on a larger scale, illustrating plastic stock folded upon itself according to one form of the invention; and Figure 6 is a plan view of a variable speed device utilized in the system for varying the speed of one of the conveyors.

Figure 1:
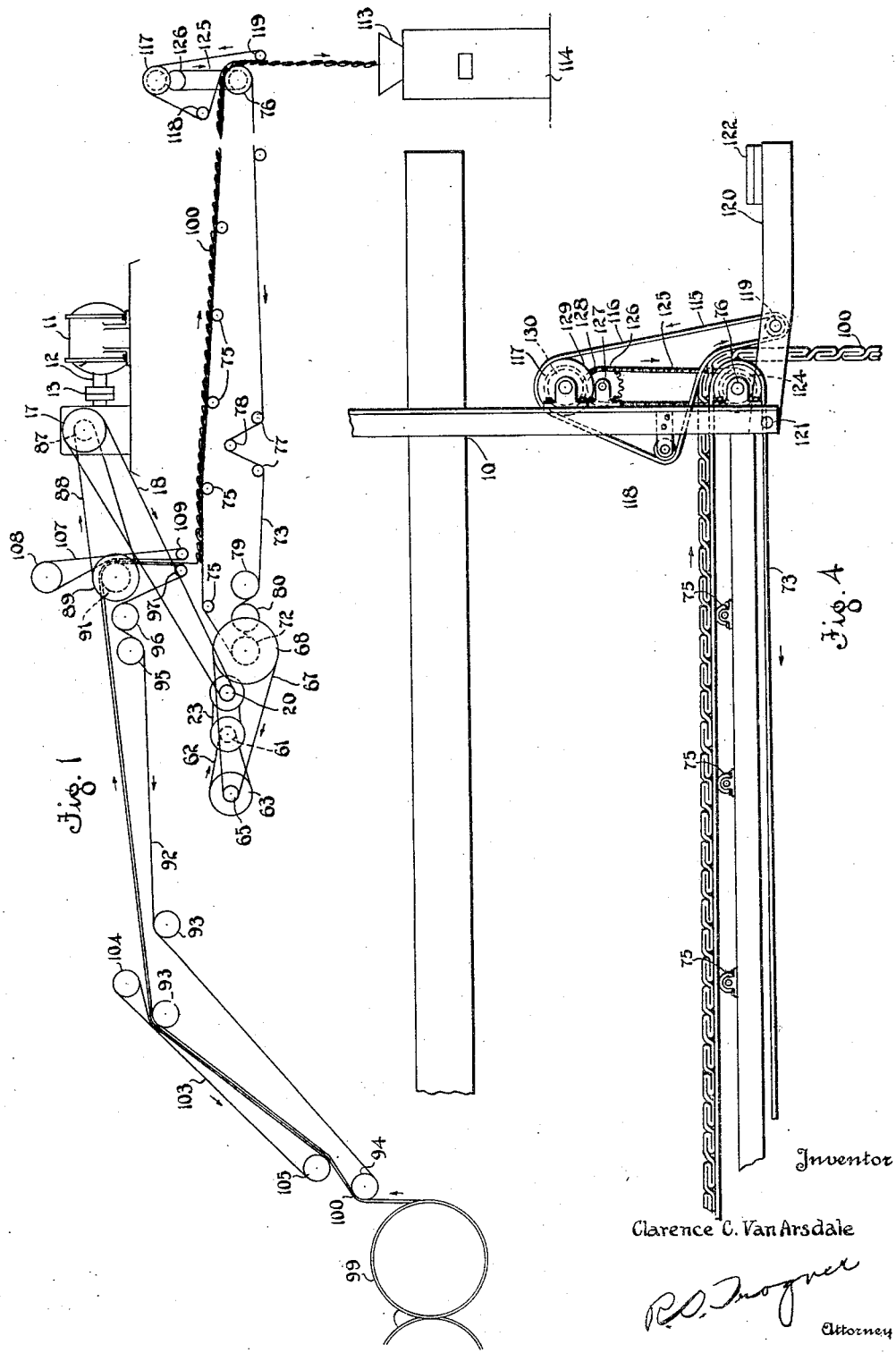
Figure 1 is a diagrammatical, elevational illustration of a conveying system provided according to one embodiment of the invention.
Figure 2:
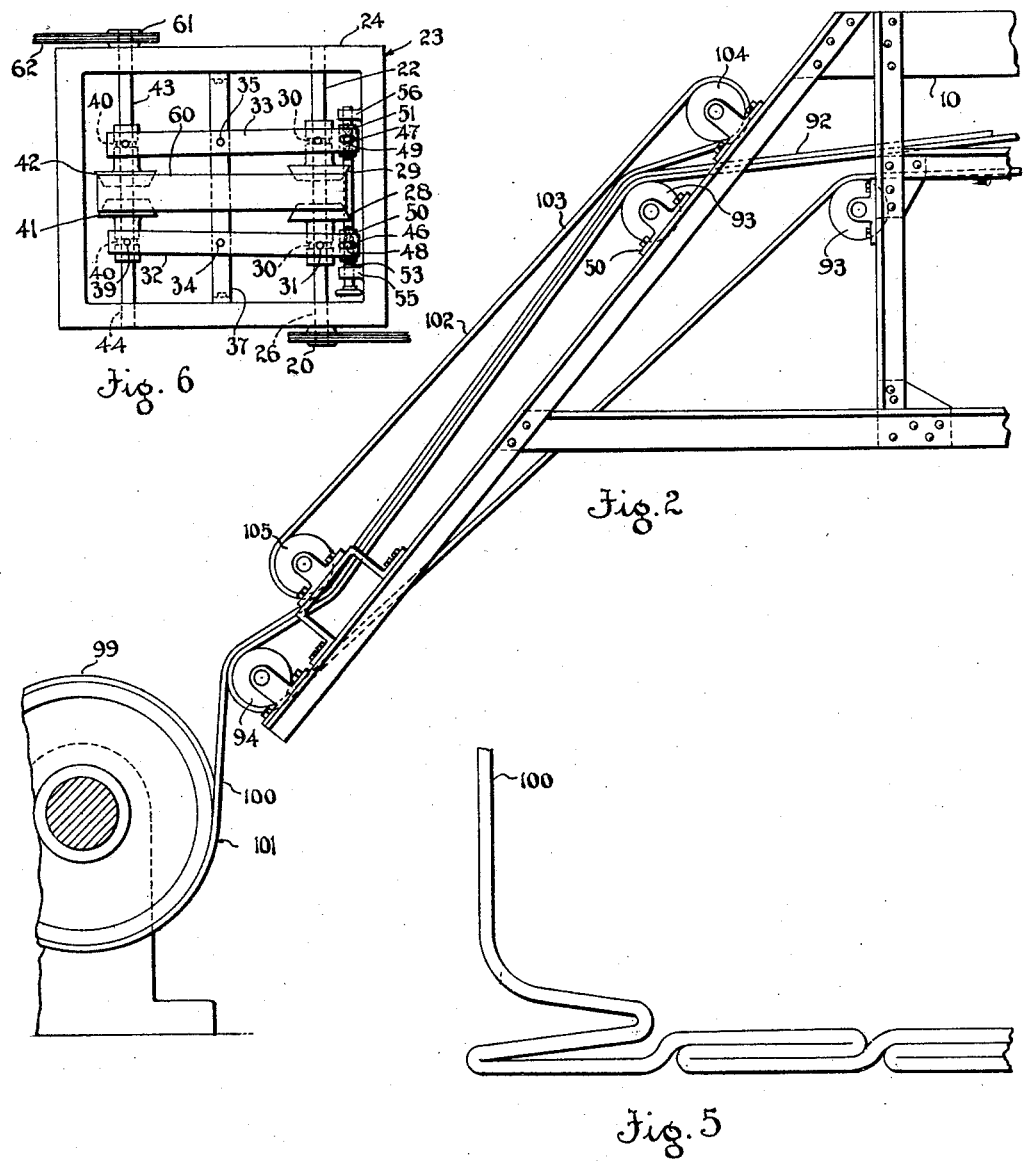
Figure 2 is a fragmentary, elevational view of that part of the conveying system disposed adjacent the milling machine.
Figure 3:
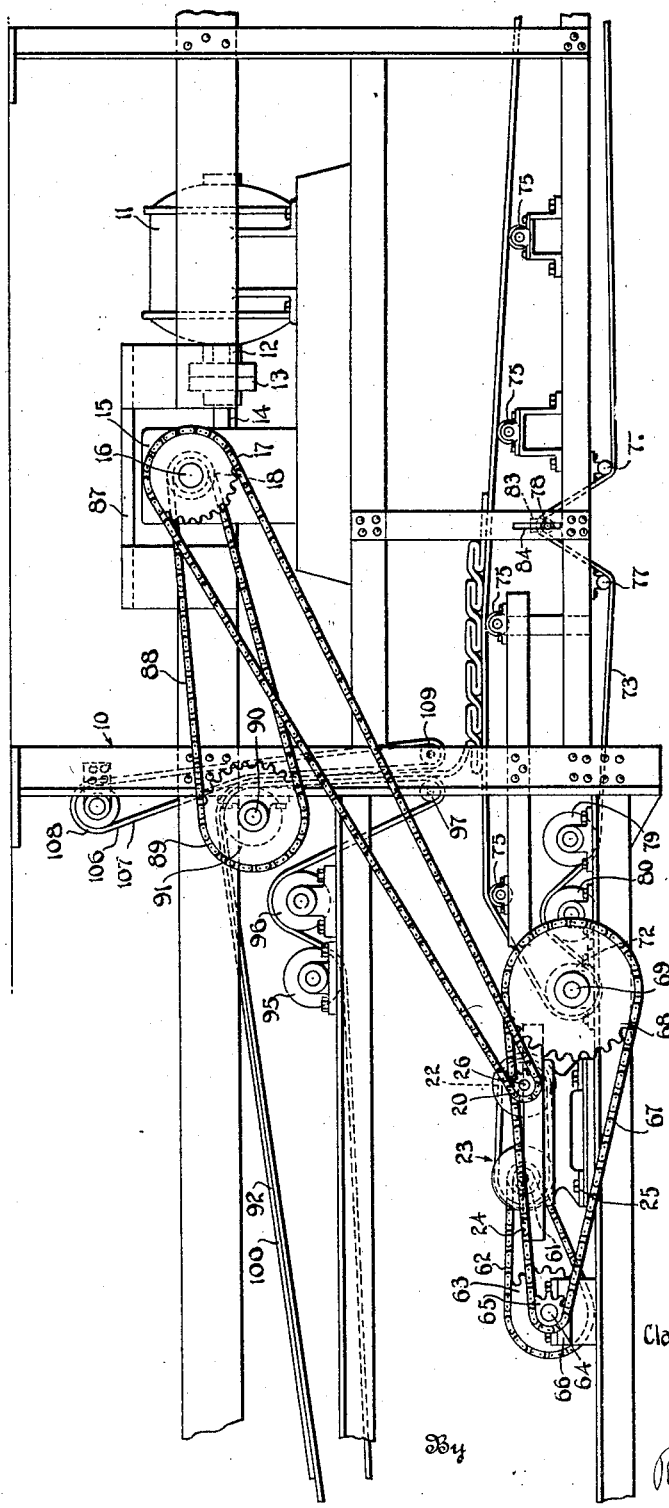
Figure 3 is a fragmentary, elevational view of the central part of a conveying system shown diagrammatically by Figure 1.

Referring to Figures 2, 3 and 4, a frame work 10 is provided, and a motor 11 having a conventional axial shaft 12 is rigidly mounted upon the frame. One end of the shaft 12 is provided with a clutch 13 which serves as a driving connection to a stud shaft 14. The latter shaft extends into a conventional reduction gearing 15 which has a shaft 16 extending therefrom and driven at a relatively slow rate of speed. A sprocket 17 having an endless chain 18 trained thereabout is rigidly secured to the outer end of the shaft 16, and the chain also is trained about a sprocket 20 that is rigidly mounted upon the outer end of a shaft 22 of an adjustable speed regulating device 23.

Frame members 24 of the speed regulating device 23 are bolted, as indicated at 25, to the frame 10, and are provided with bearings 26 for the shaft 22.

As shown best by Figure 6, conical pulleys 28 and 29, having their conical surfaces converging toward each other, are slidably splined upon the shaft 22. Portions of the pulleys are provided with circumferentially extending grooves 30, which serve as bearings for pins 31, rigidly secured to levers 32 and 33. Intermediate portions of the levers 32 and 33 are pivoted, as indicated at 34 and 35, upon a bar 37 that is supported rigidly upon the frame members 24. Additional pins 39 secured adjacent the ends of the levers 32 and 33 are disposed in grooves 40 of conical pulleys 41 and 42 that are slidably splined upon a shaft 43. Conventional bearings 44 rotatably support the shaft 43 in the frame 24.

The levers 32 and 33 are provided with slots 46 and 47 for receiving lugs 48 and 49 that are integral with internally screw-threaded blocks 50 and 51. A shaft 53 is threaded through the blocks 50 and 51 in such manner that rotation of the shaft with respect to the blocks causes the latter to move toward or away from each other according to the direction of rotation of the shaft. Journal bearings 55 and 56 support the shaft 53 on the frame 24, and a hand wheel 58 rigidly secured to one end of the shaft is provided for the purpose of rotating the latter and thereby relatively moving the blocks. A belt 60 is trained about the pulleys 28—29 and 41—42 upon the conical portions thereof, and by operating the blocks 50 and 51 to move the adjacent pulleys 28—29 toward or away from each other relatively, the speed ratio between the shafts 22 and 43 can be regulated. It will be observed that by moving the pulleys 28—29 toward each other, the pulleys 41—42 are moved correspondingly away from each other.

One end of the shaft 22 is provided with a sprocket wheel 61 having a chain 62 trained thereabout that also is trained about a relatively larger sprocket wheel 63 (Figure 3). A shaft 64 which rigidly supports the sprocket wheel 63 also rigidly supports a relatively smaller sprocket wheel 65, and is rotatably mounted in a bearing 66 that is secured to the frame 10. Also a chain 67 is trained about the sprocket wheel 65 and about a relatively larger sprocket wheel 68 that is secured to one end of a shaft 69 rotatably supported upon the frame 10.

A roller 72 is rigidly secured to the shaft 69 and serves as a driving medium for a conveyor belt 73. A number of rollers 75, 76, 77, 78, 79 and 80 rotatably mounted upon the frame 10 (Figures 3 and 4) support the conveyor belt 73 and define its path of movement. In order to vary the tension upon the belt, the roller 78 is rotatably supported upon the frame 10 by means of a bracket 83 that is adjustably mounted in a slotted portion 84 of the frame. Also, the belt 73 is trained about the lower portion of the roller 79 and the upper portion of the roller 80 in order that proper purchase may be effected about the driving roller 72.

The shaft 16 projecting from the reduction gearing 15 also is provided with a sprocket wheel 87 having a chain 88 trained thereabout and about a sprocket wheel 89 rigidly secured to a shaft 90 rotatably supported upon the frame work 10. The latter shaft is provided with a roller 91 that serves to drive a conveyor belt 92 trained thereabout. Also the conveyor belt 92 is trained about a number of rollers 93, 94, 95 and 96 (Figs. 2 and 3) and finally is directed downwardly toward the conveyor belt 73 and trained about a roller 97 disposed below the roller 91. The roller 94 (Figure 2) disposed at the end of the conveyor belt 92 remote with respect to the roller 97 is proximate to a milling machine 99 from which a strip 100 of plastic rubber compound may be severed and conducted upon the conveyor belt. One or more knives 101 serve to cut the strip of plastic rubber from the surface of a roll of the milling machine during continuous rotation of the latter. A guiding unit 102 disposed adjacent the belt 92 comprises a belt 103 which is trained about rollers 104 and 105 that are rotatably supported upon the frame work 10 adjacent the rollers 93 and 94, respectively. The rollers 104 and 105 are so arranged that a portion of the belt 103 is closely adjacent that portion of the belt 92 moving directly between the rollers 93 and 94. The strip of rubber 100 moves between the adjacent portions of the belts 92 and 103 and such portions of the belts cooperate to move the strip of rubber past the inclined portion of the belt 92 and over the roller 93.

A similar belt unit 106 is provided at the opposite end of the conveyor belt 92 for directing the strip of rubber 100 downwardly after it moves beyond the roller 91. This unit comprises a belt 107 trained about a pair of rollers 108 and 109 journalled in the frame work 10, and a portion of the belt is disposed closely adjacent that portion of the belt 92 extending directly between the roller 91 and the roller 97.

In operation of the above-described mechanism, the strip or plastic rubber stock 100 severed from a roll of the milling machine 99 is conveyed upon the belt 92 and finally directed downwardly toward the belt 73. The linear speed of the belt 92 is equal to the circumferential speed of the roll of the milling machine 99, whereas the speed of the belt 73 preferably is much less, for example, equal to one third of the speed of the belt 92. As the strip of material 100 is conveyed to the belt 73, the strip is folded upon itself in the manner illustrated by Figures 3 and 5, owing to the fact that the strip is held in substantially vertical position by the proximity of the adjacent portions of the belts 92 and 107, and the fact that the conveyor belt 73 has a linear speed less than that of the belt 92. Hence, the rubber is conducted upon the belt 73 in a folded condition.

As best shown by Figure 4, the roller 76 is disposed at one end of the conveyor belt 73 and directly above a hopper 113 of an extruding machine 114 and after the folded strip of plastic stock 100 moves past the roller 76 it moves downwardly because of gravitation into the hopper. In order firmly to retain the folded portions of the strip of plastic material in their folded form, the strip, as it passes over the roller 76, is resiliently pressed against such roller by a belt unit 115. This unit comprises a belt 116 which is trained about rollers 117 and 118 journalled upon the frame work 10 and a roller 119 rotatably supported in an arm 120 which is pivoted to the frame work 10, as indicated at 121. The free end of the arm 120 normally is urged downwardly by means of weights 122 disposed thereon. That portion of the belt 116 extending directly between the rollers 118 and 119 is adapted to contact with the strip of plastic material as it passes over the roller 76, and, owing to the fact that the roller 119 is urged downwardly by the weighted end of the arm 120, the folds of the strip of plastic material are firmly pressed together by the belt 116 prior to their movement downwardly into the hopper 113 of the extruding machine.

While it may not be necessary in all instances to drive the belt 116, it is preferable to do so, and, for effecting this purpose, the shaft of the roller 76 is provided with a sprocket wheel 124 about which a chain 125 is trained. In turn this chain is trained about a sprocket wheel 126 which is rigidly secured to a shaft 127 journalled in the framework 10 between the rollers 76 and 117. The shaft 127 is provided with a gear 128 which meshes with a gear 130 rigidly secured to the shaft supporting the roller 117. By reason of this construction, the belt 116 is positively driven by the roller 76 in such a direction that that portion of the belt extending directly between the rollers 118 and 119 travels in the same direction as the belt 73 as it passes over the roller 76. The roller 76 also may be positively driven if found desirable by providing a driving connection such as a chain, between it and the roller 72.

From the foregoing description it is apparent that a method has been provided for conveying plastic rubber from a roll of a milling machine operating at a definite peripheral speed, into an extruding machine capable only of receiving the rubber at a linear speed less than that of the peripheral speed of the milling machine roll. Moreover, it is apparent that a conveying system has been provided for effecting this method, in which the strip of rubber during its movement from the milling machine to the extruding machine is folded upon itself and conducted into such form to the extruding machine. Also, it is apparent that the manner of folding the strip upon itself, as well as the speed in which the strip may be effected, may be varied by regulating the relative speeds of the conveyors.

Although only the preferred form of the invention has been illustrated and described in detail, it will be apparent to those skilled in the art that the invention is not so limited, but that various modifications may be made therein without departing from the spirit of the invention or from the scope of the appended claims.

What I claim is:

1. The method of conveying a continuous strip of plastic material from a milling machine to an extruding machine, comprising continuously forming a strip of material at the milling machine, conveying the strip initially at the speed which it leaves the milling machine, thereafter conducting it upon a conveyor having a linear speed less than that of the first conveyor so that a unit length of stock is manipulated into a space of lesser length, and passing the concentrated stock continuously to the extruding machine.

2. The method of conveying a continuous strip of flexible material which comprises conveying the strip initially at one speed, thereafter conveying it at a lesser speed so that a unit length of the stock is manipulated into a smaller linear space, and pressing the stock together so that it will retain its concentrated form.

3. The method of conveying a continuous strip of plastic material comprising conveying it at one linear rate of speed, thereafter folding it upon itself upon a conveyor moving at a lesser linear speed to concentrate the weight per unit length thereof, and pressing folds together so that the material will remain in its concentrated form.

4. The method of feeding a plastic extruding machine which comprises continuously forming a sheet of plastic material on a mill, continuously passing the sheet of material to the extruding machine and continuously folding the sheet upon itself during its passage from the mill to the extruding machine to provide a greater weight and volume of the material per unit length.

5. The method of feeding a plastic extruding machine which comprises continuously forming a sheet of plastic material on a mill, continuously passing the sheet of material to the extruding machine and increasing the weight and volume of the sheet per unit length during its passage from the mill to the extruding machine.

6. The combination with a plastic extruding machine of means for supplying a continuous sheet of plastic material, conveying means for continuously passing the plastic sheet to the extruding machine, means in said conveying means for making continuous and consecutive folds in the plastic sheet to increase the weight and volume per unit length, and means for pressing the folds together to retain the sheet in the concentrated form.

7. The combination with a plastic extruding machine of means for supplying a continuous sheet of plastic material, conveying means for continuously passing the plastic sheet to the extruding machine, and means in said conveying means for making continuous and consecutive folds in the plastic sheet to increase the weight and volume per unit length.

8. The combination with a plastic extruding machine of means for supplying a continuous sheet of plastic material, conveying means for continuously passing the plastic sheet to the extruding machine, and means in said conveying means for increasing and concentrating the weight and volume of the plastic sheet per unit length.

In witness whereof, I have hereunto signed my name.

Signed at Akron, in the county of Summit and State of Ohio, U. S. A., this 4th day of December, 1929.

CLARENCE C. VAN ARSDALE.